(12) United States Patent
Tucker et al.

(10) Patent No.: US 12,233,363 B2
(45) Date of Patent: Feb. 25, 2025

(54) VAPOR DISTRIBUTION SYSTEM IN A CONCENTRIC REBOILER

(71) Applicant: UOP LLC, Des Plaines, IL (US)

(72) Inventors: Raymond Tucker, Derby, NY (US); Trung Pham, Fox River Grove, IL (US); Stephanie Fuyue Li, Mount Prospect, IL (US); Zhanping Xu, Inverness, IL (US); James Althoff, Wilmette, IL (US)

(73) Assignee: UOP LLC

( * ) Notice: Subject to any disclaimer, the term of this patent is extended or adjusted under 35 U.S.C. 154(b) by 0 days.

(21) Appl. No.: 17/897,171

(22) Filed: Aug. 28, 2022

(65) Prior Publication Data

US 2023/0074304 A1 Mar. 9, 2023

Related U.S. Application Data

(60) Provisional application No. 63/241,283, filed on Sep. 7, 2021.

(51) Int. Cl.
*B01D 3/32* (2006.01)
*B01D 3/00* (2006.01)
(Continued)

(52) U.S. Cl.
CPC .............. *B01D 3/322* (2013.01); *B01D 3/007* (2013.01); *F28D 1/0213* (2013.01); *F28D 1/04* (2013.01);
(Continued)

(58) Field of Classification Search
CPC ....... B01D 3/322; B01D 3/007; F28D 1/0213; F28D 1/04; F28F 13/06
See application file for complete search history.

(56) References Cited

U.S. PATENT DOCUMENTS 3,177,129 A * 4/1965 Huckins, Jr. ............. B01D 3/32
159/27.2
4,114,684 A * 9/1978 Jenis ..................... F28F 9/0131
165/DIG. 54

(Continued)

FOREIGN PATENT DOCUMENTS

| CN | 208852450 U | 5/2019 | |
| EP | 3171108 A1 | 5/2017 | |
| JP | H09276601 A | * 10/1997 | ............. B01D 3/322 |

OTHER PUBLICATIONS

Search Machine Translation of JP-H09276601-A obtained Mar. 16, 2023. (Year: 2023).*

(Continued)

*Primary Examiner* — Jonathan Miller
(74) *Attorney, Agent, or Firm* — Paschall & Associates, LLC; Mark Goldberg

(57) ABSTRACT

Heat exchangers (also referred to as exchangers herein) are provided that fit within a bottom sump of a distillation column. These heat exchangers may be at least partially submerged in the bottoms fluid of the distillation column so that the exterior surface of the heat exchanger can contribute to the total area of the heat exchanger. The internal configuration of the exchanger allows for annular coaxial flow of the hot fluid (condensing vapor stream) and eliminates the need for top and bottom channel heads.

18 Claims, 8 Drawing Sheets

(51) Int. Cl.
 *F28D 1/02* (2006.01)
 *F28D 1/04* (2006.01)
 *F28F 13/06* (2006.01)
 *F28D 21/00* (2006.01)

(52) U.S. Cl.
 CPC ...... *F28F 13/06* (2013.01); *F28D 2021/0063* (2013.01)

(56) References Cited

U.S. PATENT DOCUMENTS

| | | | | |
|---|---|---|---|---|
| 4,436,146 | A * | 3/1984 | Smolarek | F28F 9/00 165/DIG. 207 |
| 4,733,722 | A * | 3/1988 | Forbes | F28F 9/00 165/158 |
| 4,843,828 | A | 7/1989 | Gladman | |
| 5,141,049 | A * | 8/1992 | Larsen | F28F 9/22 165/158 |
| 5,775,129 | A * | 7/1998 | Satchell, Jr. | F28D 9/0068 165/110 |
| 6,351,968 | B1 * | 3/2002 | Habicht | F25J 3/04824 62/643 |
| 6,393,866 | B1 * | 5/2002 | Srinivasan | F25J 5/005 62/643 |
| 8,196,909 | B2 * | 6/2012 | Daly | F28F 1/24 165/184 |
| 8,684,337 | B2 | 4/2014 | Daly | |
| 9,297,580 | B2 | 3/2016 | Daly | |
| 9,366,476 | B2 * | 6/2016 | Tuo | F25J 5/005 |
| 9,920,988 | B2 * | 3/2018 | Chakravarthy | F25J 3/04824 |
| 10,012,439 | B2 * | 7/2018 | Shelat | F25J 5/005 |
| 10,337,792 | B2 * | 7/2019 | Prosser | F25J 3/048 |
| 2005/0210916 | A1 * | 9/2005 | Prentice | F25J 3/04424 62/647 |
| 2016/0153712 | A1 * | 6/2016 | Kibler | F25J 3/04678 62/646 |

OTHER PUBLICATIONS

Search Report and Written Opinion for PCT/US2022/075831 dated Dec. 22, 2022.

* cited by examiner

VAPOR DISTRIBUTION SYSTEM IN A CONCENTRIC REBOILER

This application claims priority from provisional application Ser. No. 63/241,283 filed Sep. 7, 2021 which is incorporated herein in its entirety.

Heat exchangers are prevalent in refining, petrochemical, and other industrial applications in order to efficiently transfer heat available in one process fluid to another fluid, such that the overall utility requirements are reduced. The advantages of using heat exchangers, for example, to optimize the recovery of heat and thereby minimize the costs associated with outside sources of cooling/refrigeration media (e.g., cooling water) and/or heating media (e.g., fuel gas) are well recognized.

Heat exchange is commonly carried out, for example, between a relatively hot reactor effluent fluid and a relatively cold reactor feed fluid. A specific application for heat exchangers involves their use within (rather than external to) other processing equipment such as vapor-liquid contacting apparatuses and even reactors.

Vapor-liquid contacting apparatuses known to utilize internal heat exchangers, and particularly condensers, include distillation columns. The specific operating conditions of distillation columns employing internal heat exchangers may vary significantly in order to accomplish a wide range of component separations from vastly different types of mixtures that may be subjected to distillation. Examples of distillation columns include those used in a number of column separations such as stripping and rectification, as well as those used in various forms of distillation such as fractional distillation, steam distillation, reactive distillation, and distillation in divided wall columns. These separation processes may be operated using distillation columns in either batch or continuous modes, with common design objectives being the reduction in installed and operating costs.

Various benefits may be achieved from installing heat exchangers inside distillation columns or other apparatuses, rather than external to the cylindrical column shell. These benefits may be appreciated with reference to the operation of conventional external heat exchangers, which require removing a stream from the column, passing it through the external exchanger to supply or remove heat, and returning at least part of the heated or cooled stream back to the column.

By locating a heat exchanger within a vapor-liquid contacting apparatus such as a distillation column, some equipment (e.g., an overhead reflux pump) and the associated supporting structure can be eliminated, thereby saving both equipment cost and space.

A particular type of heat exchanger that may be used internally (or that is otherwise commonly employed commercially), is a tubular exchanger comprising a bundle of tubes, whereby heat is transferred between fluid external to the tubes and fluid passing through the tubes. So-called "stabbed-in" tube bundles have advantages over internal welded plate bundles in terms of their ease of removal for maintenance or replacement. In the case of stabbed-in tubular condensers, with the tubes being oriented horizontally or vertically in the top section of a distillation column, overhead vapor in the column is condensed on the outside or external surface of the tubes. There is therefore an ongoing need in the art for improvements in the heat transfer coefficient (and the corresponding reduction in required condenser tube surface area), and/or overall performance of tubular condensers, and particularly those disposed within a vapor-liquid contacting apparatus such as a distillation column.

SUMMARY

Heat exchangers (also referred to as exchangers herein) are provided that fit within a bottom sump of a distillation column. These heat exchangers may be at least partially submerged in the bottoms fluid of the distillation column so that the exterior surface of the heat exchanger can contribute to the total area of the heat exchanger. The internal configuration of the exchanger allows for annular coaxial flow of the hot fluid (condensing vapor stream) and eliminates the need for top and bottom channel heads. There may be internal baffles, such as concentric ring baffles in the heat exchangers to ensure uniform flow distribution and provide for structural support to prevent tube vibration. This type of arrangement may be applicable in a variety of applications.

DETAILED DESCRIPTION

Figure 1:
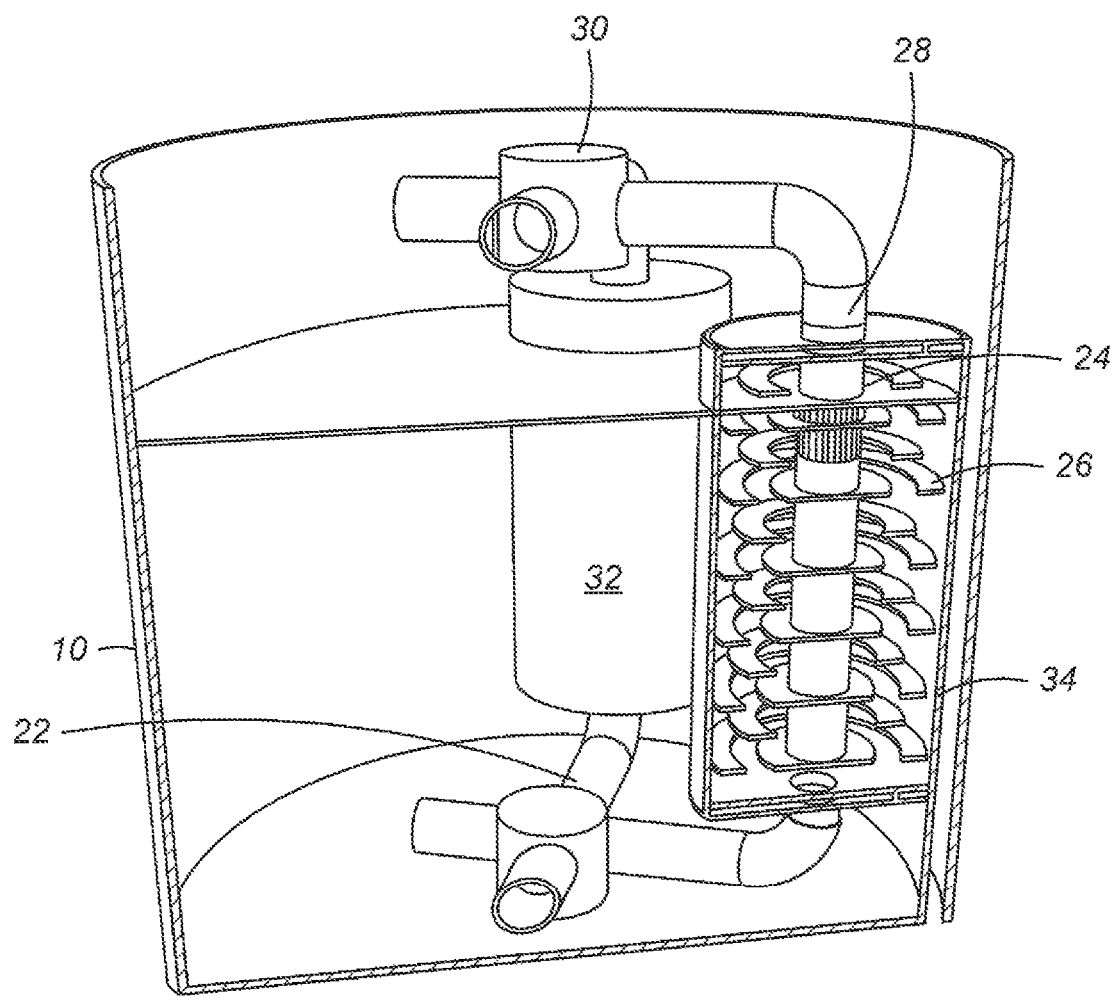
FIG. 1 shows a heat exchanger with baffles positioned in a distillation column.

A distillation column is provided wherein a bottom portion of at least one heat exchanger is positioned within a bottom sump of the distillation column. At least one heat exchanger may be configured to allow coaxial flow of a condensing vapor stream. At least one heat exchanger contains internal concentric ring baffles. In addition, each heat exchanger has a central vapor inlet pipe wherein the central vapor inlet pipe has a series of openings. An inlet pipe is attached to one end of the central vapor inlet pipe and a liquid outlet pipe is connected to the bottom tubesheet, directly below the central vapor inlet pipe. There may be multiple heat exchangers positioned within the distillation column, such as four heat exchangers in one particular embodiment. The types of columns may include a reboiler unit or a splitter column. In order to have efficient heat distribution, there may be a multiplicity of metal tubes filling an annulus shaped space between a central vapor inlet pipe positioned around a central point of a diameter of the heat exchanger and an inner surface of an outer shell of the heat exchanger. The outer shell of the concentric heat exchanger may be uninsulated. In the heat exchanger, each of the metal tubes are open at a bottom end and a top end and are configured to allow liquid to enter the bottom end and to allow liquid and vapor to flow from the top end. The central vapor inlet pipe comprises an opening in an upper section of the heat exchanger connecting to an inlet pipe and an opening in a lower section of the heat exchanger in communication with an outlet pipe. The distillation column may further comprise a series of trays positioned within the column to deflect and redirect gas flow within the distillation column. The metal tubes may be about 0.75-1.25 inches in diameter (outer diameter) and comprise carbon steel, stainless steel, copper/nickel, aluminum or other suitable metallurgies. In a preferred embodiment, the metal tubes may be made from High Flux aluminum tubing having an internal coating for boiling and external fluting for condensation enhancement. The aluminum tubes are less than ⅓ the weight of prior art carbon steel tubes. The external fluting provides for about 50% more external surface area as well as enhanced liquid drainage since liquid condenses on the flute tips and then drains into the valleys between flutes. Due to installation and maintenance considerations, the distillation column may include an angled side manway which may be used to allow installation and removal of 1 or multiple heat exchangers.

In a version of the invention, there are a series of tube supports/concentric flow baffles. These can be 360-degree concentric ring baffles to encourage annular flow vapor distribution. There may be 2-6 different diameter ring baffles used depending upon modelling of ring baffles. Ideally, there is a row of overlap of the ring baffles to support tubes along the edge of the baffle support. The baffles are generally placed in a balance between preventing tube vibration and minimizing shellside pressure drop. The arrangement is ideal for heat integration.

Figure 2A:
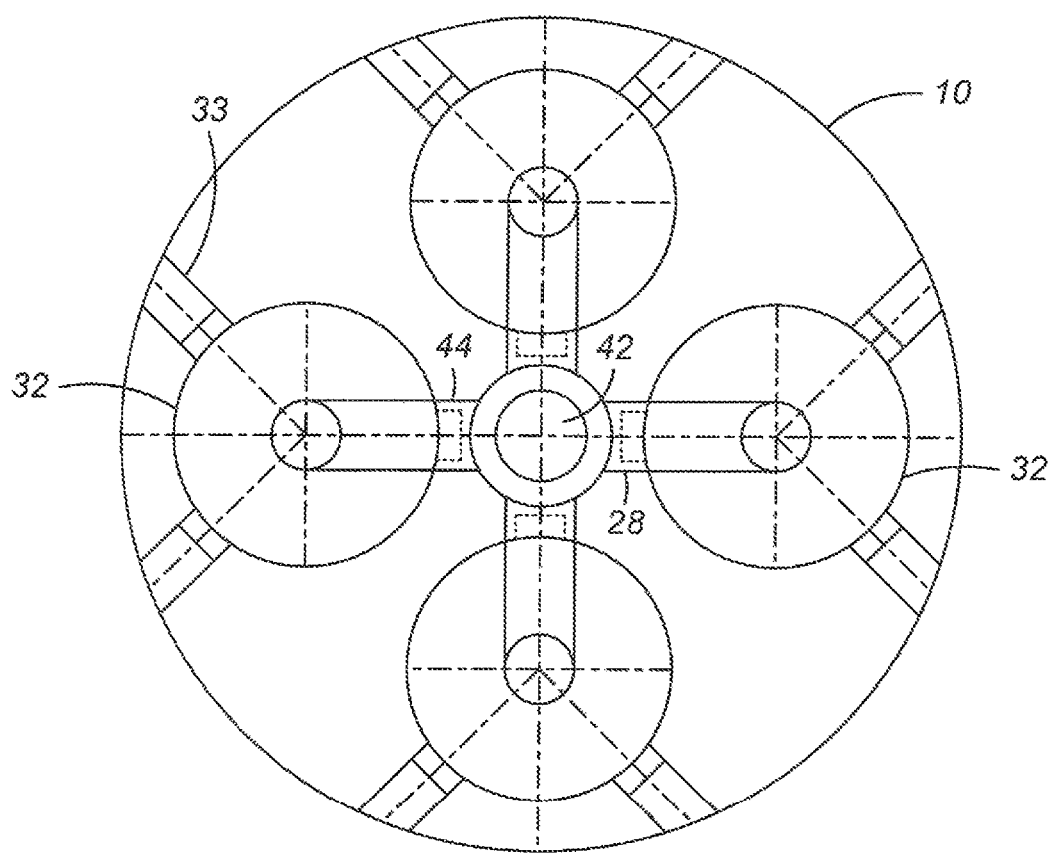
FIG. 2a shows a top view of a distillation column with a set of heat exchangers in place.
Figure 2B:
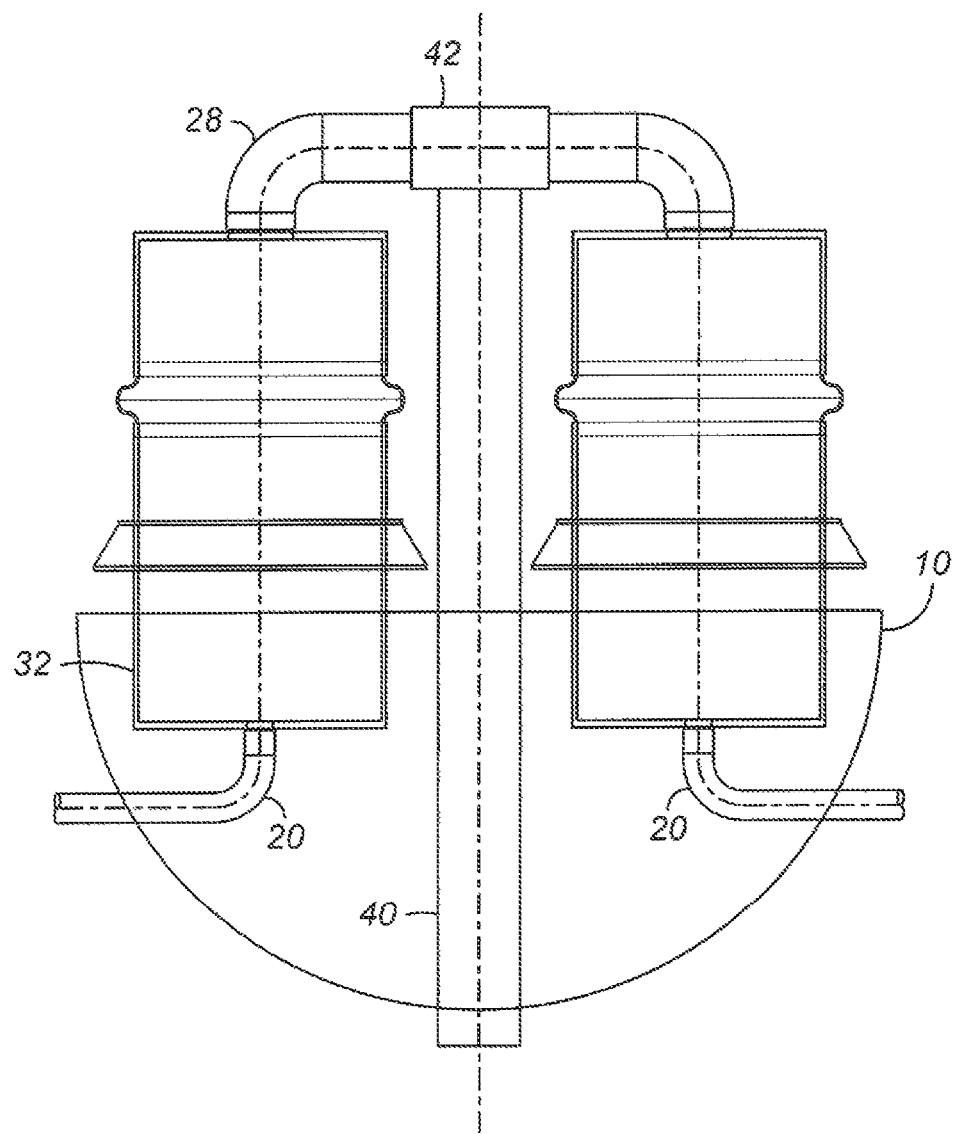
FIG. 2b shows a side view of a distillation column with two heat exchangers with supports and connecting pipes.

The invention may be better understood by reference to the Figures. In FIG. 1 is shown a side cutaway of a distillation column 10 with two heat exchangers 32 and 34. Heat exchanger 34 is shown so that the internal components are displayed. A top hub is shown with inlet pipes 28 shown entering the portion of the heat exchanger that has a central pipe 24 and baffles 26. As displayed here, there is room for four heat exchangers as shown by the inlets and outlets at the bottom and top of the heat exchangers. There are supports 33 that are shown in FIG. 2a that help to position the heat exchangers in place. FIG. 2a shows four heat exchangers 32 that are positioned around a central hub 42 with piping 28 shown from hub 42 to the top of each heat exchanger 32. In the sideview of FIG. 2b, two of the heat exchangers 32 can be seen with a pipe 28 extending from the top to a hub 42 that is connected to a centerpipe 40. Also shown are pipes 20 exiting the bottom of heat exchangers 32.

Figure 3:
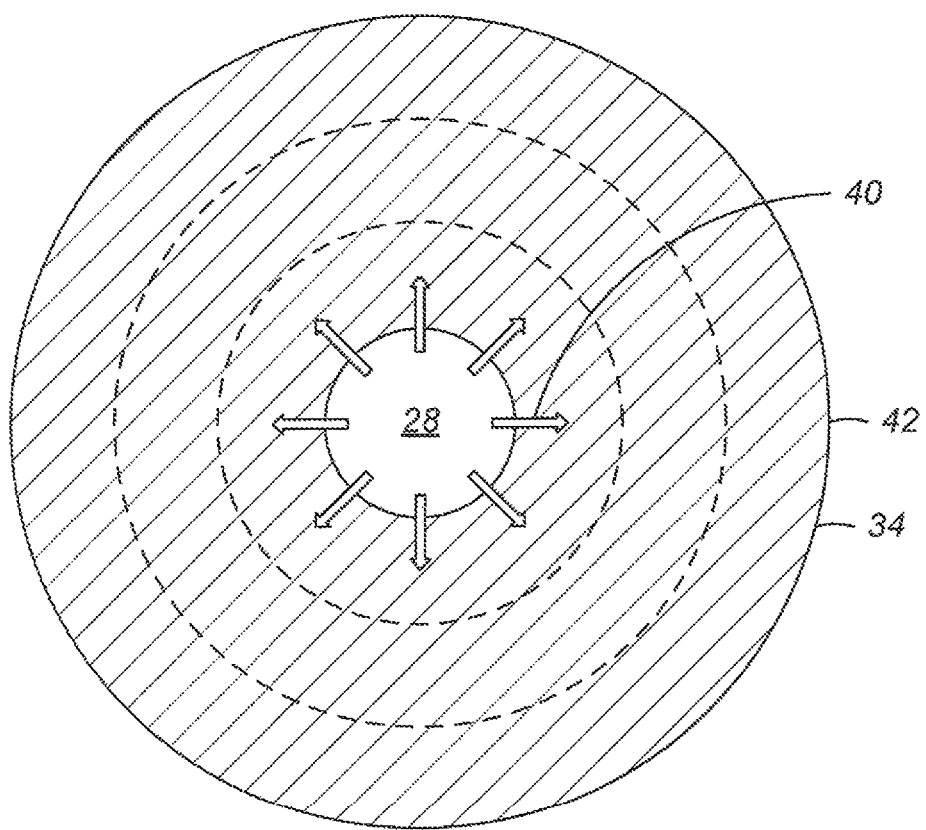
FIG. 3 shows a top view of a concentric heat exchanger.

FIG. 3 shows a top view of a concentric heat exchanger 34 with vapor passing from central pipe 28 through vertical slots (not shown) in a radial direction from the central pipe. There are tubes that fill the annulus between central pipe 28 and the outer wall 42 of the heat exchanger 34. The tubes are open at the top and bottom to allow flow of liquid into the bottom of the heat exchanger and exit as liquid and vapor from the top. The heat exchanger may be partially submerged in a column sump. Outer shell 42 is uninsulated which contributes to the total effective heat transfer area contribution.

Figure 4:
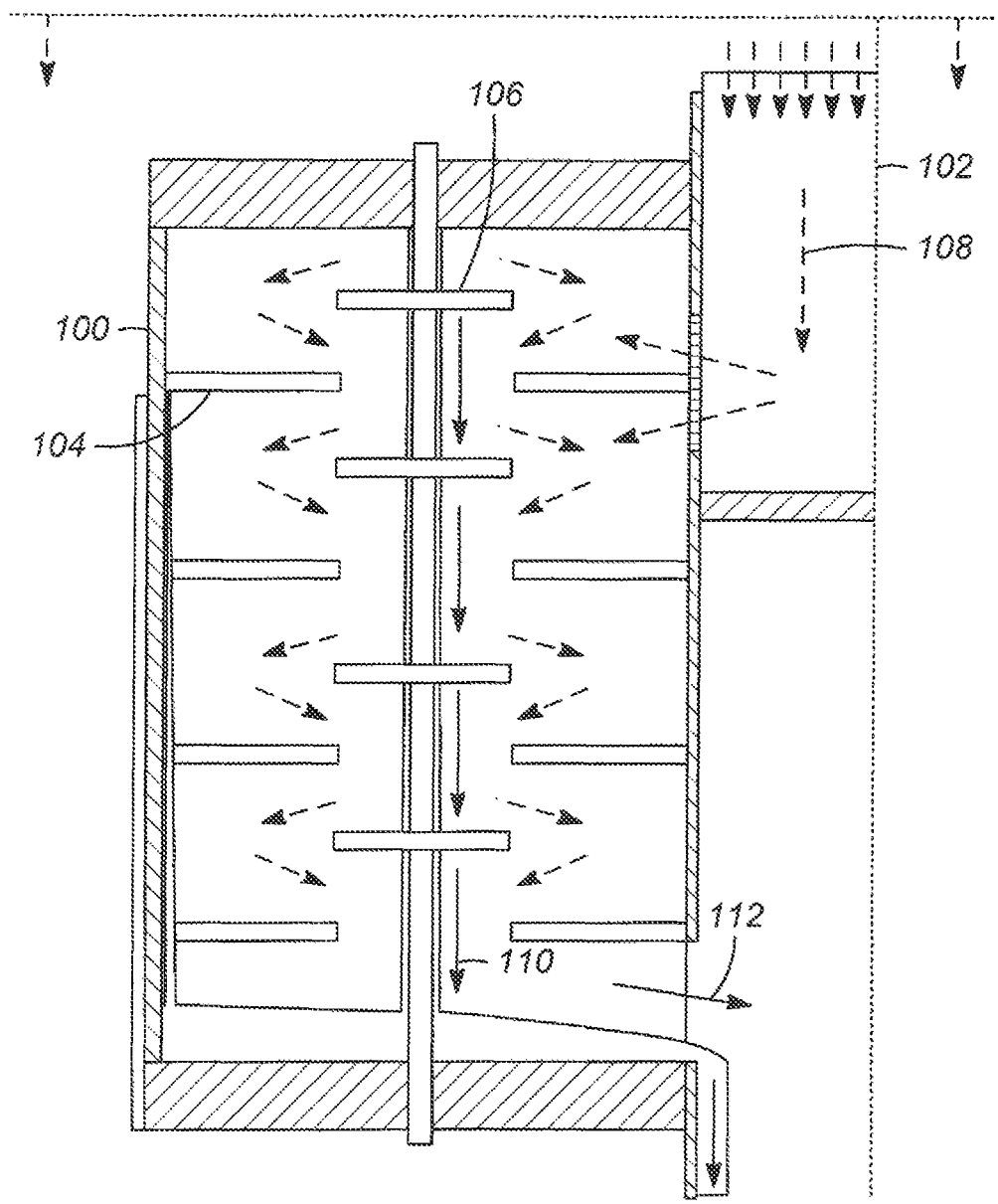
FIG. 4 shows a cross section view inside the shell of a concentric heat exchanger.

FIG. 4 is a simplified view of a cross section within a heat exchanger 100. An upper portion of center pipe 102 is shown for introduction of vapor 108 with the flow being directed according to baffles 104 and 106 that are positioned inside the shell. Condensing vapor 110 falls to the bottom of the shell of the heat exchanger and there are boiling temperatures outside of the shell and inside the tubes (not shown).

Figure 5C:
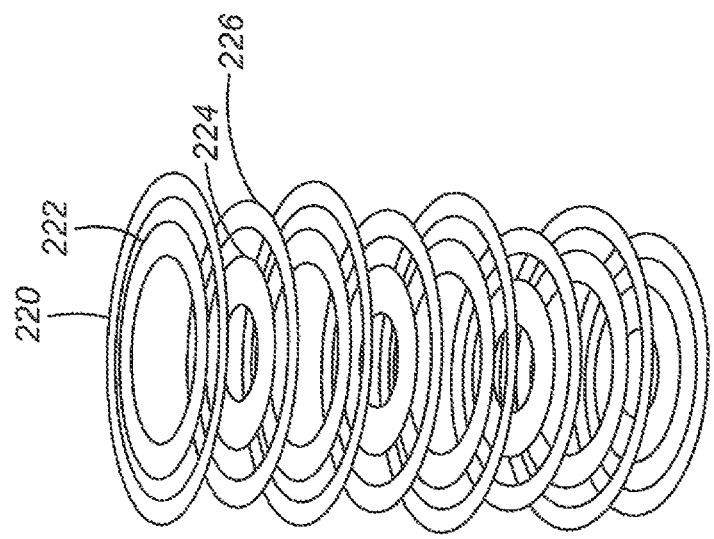
FIG. 5B shows an example of three ring baffles and FIG. 5C shows an example of four ring baffles.
Figure 5B:
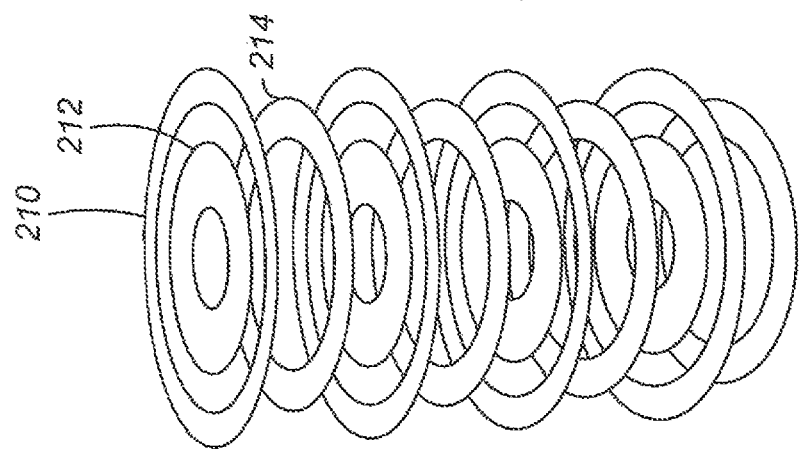
Figure 5A:
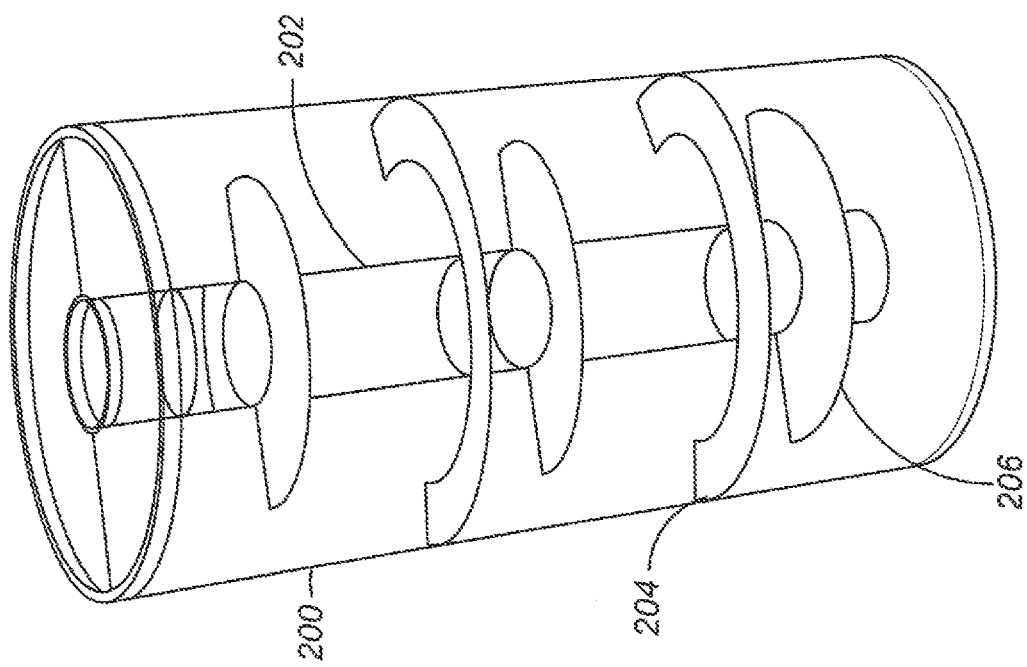
FIG. 5A shows an example of two ring baffles.

FIG. 5A, FIG. 5B and FIG. 5C show the positioning of annular flow baffles within a heat exchanger 200. On the left in FIG. 5A the two different sizes of annular baffles 204 and 206 are shown around a central pipe 202. In the middle in FIG. 5B are shown the three-ring configuration with rings 210, 212 and 214. On the right, FIG. 5C is the most complex configuration shown with four rings 220, 222, 224 and 226. While not shown, a more complex configuration such as six rings is feasible.

Figure 6:
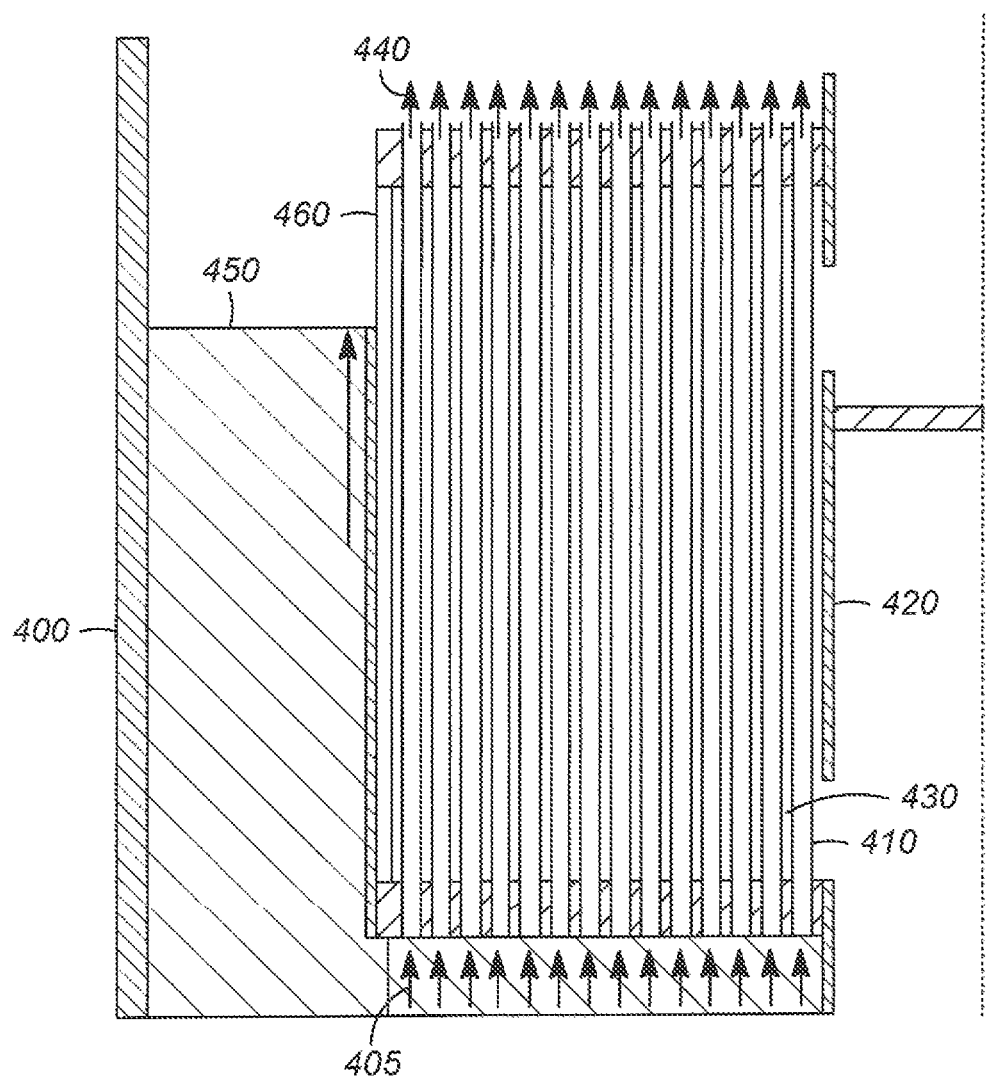
FIG. 6 shows a submerged tube bundle with a simplified tubeside flow path.

FIG. 6 shows a configuration with a submerged tube bundle that is within a heat exchanger. The outer wall 400 of the distillation column is shown with the bottom portion of heat exchanger 460 partially submerged in liquid 450. A tube bundle consisting of tubes 410 are shown with spaces 430 in between each two tubes. Cold liquid 405 passes upwards through tubes 410 to exit as two-phase liquid/vapor at 440. A wall 420 of a central vapor pipe is shown.

Figure 7:
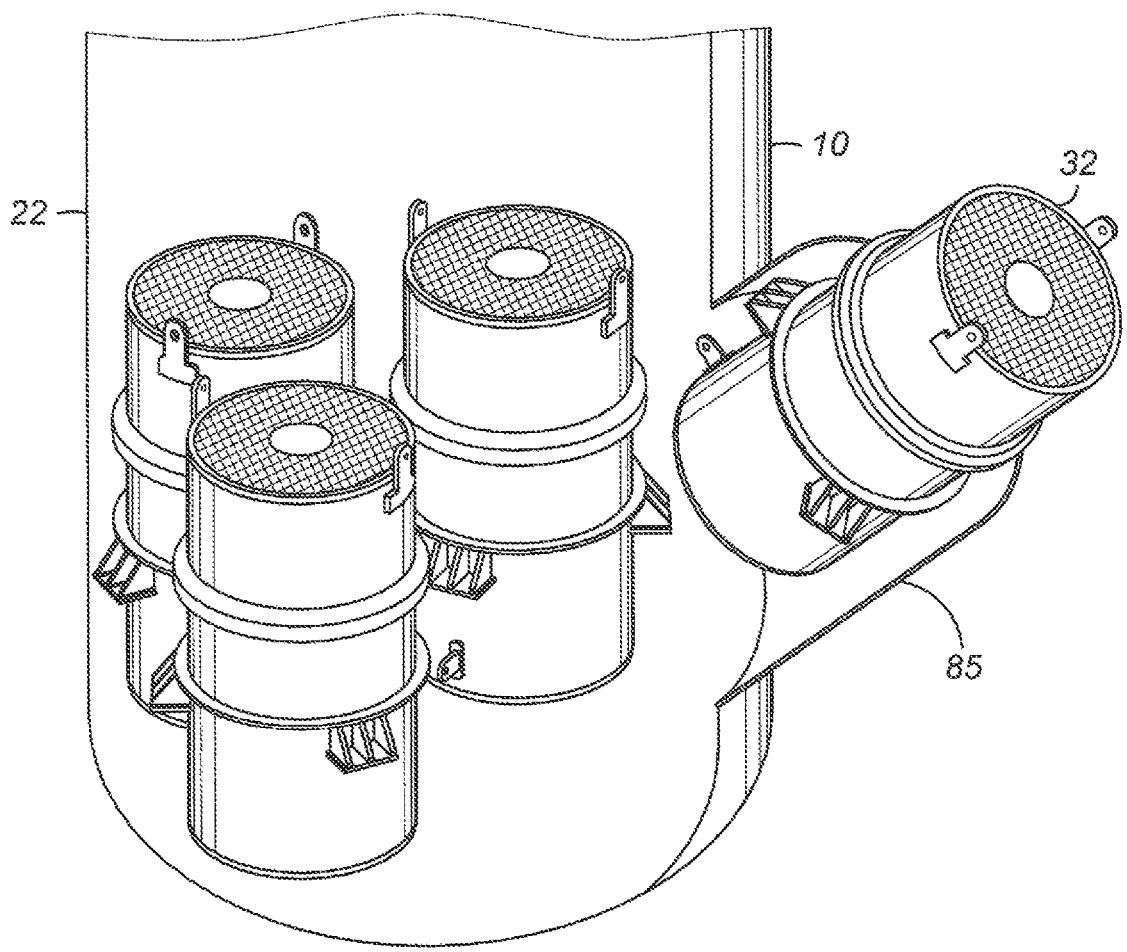
FIG. 7 shows a distillation column with an angled access passage having a heat exchanger.

FIG. 7 shows a configuration of a distillation column 10 with an outer wall 22 that has an angled access passage 85 enabling them to install or service heat exchanger 32 with three heat exchangers positioned in place and a fourth heat exchanger shown in position to be installed or replaced as necessary.

In an embodiment, the invention involves a distillation column wherein a bottom portion of at least one heat exchanger is positioned within a bottom sump of said distillation column. The at least on heat exchanger is configured to allow coaxial flow of a condensing vapor stream. The heat exchangers may contain baffles such as internal concentric baffles, radial baffle blades or helical baffles. The heat exchangers may further comprise a central vapor inlet pipe wherein the central vapor inlet pipe has a series of openings. There may be an inlet pipe that is attached to one end of said central vapor inlet pipe and an outlet pipe is provided to allow drainage of liquid condensate from a bottom nozzle. In some configurations, there may be 2-6 heat exchangers positioned symmetrically within the distillation column. The distillation column may be a reboiler unit, a splitter column or other type of column used to separate mixtures. In some embodiments, there may be a multiplicity of metal tubes that fill an annulus shaped space between a central vapor inlet pipe positioned around a central point of a diameter of the heat exchanger and an inner surface of an outer shell of said distillation column. The outer shell may be outer shell is uninsulated. In the distillation column each of the metal tubes may be open at a bottom end and a top end and configured to allow liquid to enter into the bottom end and configured to allow liquid and vapor to flow from said top end. The distillation column of claim 4 wherein said central vapor inlet pipe comprises an opening in an upper section of said distillation column connecting to an inlet pipe and an opening in a lower section of said distillation column in communication with an outlet pipe. The distillation column may further be comprising a series of trays positioned within the column to deflect and redirect gas flow within said distillation column. The metal tubes may comprise carbon steel or aluminum. There may be an access opening to a passage within the distillation column for installation and removal of the heat exchangers or other components. The series of baffles positioned parallel to the bottom and top of the heat exchangers may have different sizes such as 2, 3 or 4 different sizes. The heat exchanger's central vapor inlet pipe may contain vertical slots configured for passage of vapor. The heat exchanger may be in a position to be partially submerged in liquid. The tubes within the distillation column may be open at a top and a bottom of said heat exchanger wherein said bottom sump is partially filled with a liquid.

The invention claimed is:

1. A distillation column comprising:
   at least one heat exchanger,
   wherein a bottom portion of the at least one heat exchanger is positioned within a bottom sump of said distillation column,
   wherein said heat exchanger comprises a central vapor inlet pipe and an outer shell forming an annulus shaped space between said central vapor inlet pipe and an inner surface of said outer shell, and
   wherein said heat exchanger contains a series of internal concentric ring baffles for directing flow of vapor inside said outer shell.

2. The distillation column of claim 1 wherein said at least one heat exchanger is configured to allow coaxial flow of a condensing vapor stream.

3. The distillation column of claim 2 wherein said outer shell is uninsulated.

4. The distillation column of claim 2 wherein said central vapor inlet pipe comprises an opening in an upper section of said distillation column connecting to an inlet pipe and an opening in a lower section of said distillation column in communication with an outlet pipe.

5. The distillation column of claim 1 wherein said central vapor inlet pipe has a series of openings.

6. The distillation column of claim 5 wherein an inlet pipe is attached to one end of said central vapor inlet pipe and an outlet pipe is provided to allow drainage of liquid condensate from a bottom nozzle.

7. The distillation column of claim 5 wherein said central vapor inlet pipe contains vertical slots configured for passage of vapor.

8. The distillation column of claim 1 wherein said at least one heat exchanger comprises multiple heat exchangers that are positioned symmetrically within said distillation column and wherein said multiple heat exchangers comprise 2-6 heat exchangers.

9. The distillation column of claim 1 wherein said distillation column is reboiler unit or a splitter column.

10. The distillation column of claim 1 wherein a multiplicity of metal tubes fill said annulus shaped space between said central vapor inlet pipe positioned around a central point of a diameter of said heat exchanger and the inner surface of said outer shell of said heat exchanger.

11. The distillation column of claim 10 wherein each of said metal tubes are open at a bottom end and a top end and configured to allow liquid to enter into said bottom end and configured to allow liquid and vapor to flow from said top end.

12. The distillation column of claim 10 wherein said metal tubes comprise carbon steel or aluminum.

13. The distillation column of claim 1 further comprising a series of trays positioned within said column to deflect and redirect gas flow within said distillation column.

14. The distillation column of claim 1 further comprising an access opening to a passage of the distillation column for installation and removal of said heat exchangers.

15. The distillation column of claim 14 wherein said access opening is configured at an angle to allow said heat exchangers to be inserted into a bottom portion of said distillation column.

16. The distillation column of claim 1 further comprising a series of baffles positioned parallel to a bottom and top of said exchanger wherein said baffles have 2,3 or 4 different sizes.

17. The distillation column of claim 1 wherein said heat exchanger is in position to be partially submerged in liquid.

18. The distillation column of claim 1 comprising tubes open at a top and bottom of said heat exchanger wherein said bottom sump is partially filled with a liquid.

* * * * *